United States Patent
Bedak et al.

(10) Patent No.: US 9,527,475 B2
(45) Date of Patent: Dec. 27, 2016

(54) BELT RETRACTOR, AND METHOD FOR LOCKING A BELT RETRACTOR

(71) Applicant: TRW Automotive GmbH, Alfdorf (DE)

(72) Inventors: Nizam Bedak, Schwaebisch Gmuend (DE); Thomas Kielwein, Eschach (DE); Frederic Michel, Schwaebisch Gmuend (DE); Juergen Rink, Waldstetten (DE); Demal Sehic, Schwaebisch Gmuend (DE)

(73) Assignee: TRW Automotive GmbH (DE)

( * ) Notice: Subject to any disclaimer, the term of this patent is extended or adjusted under 35 U.S.C. 154(b) by 180 days.

(21) Appl. No.: 14/383,973

(22) PCT Filed: Mar. 6, 2013

(86) PCT No.: PCT/EP2013/000651
§ 371 (c)(1),
(2) Date: Sep. 9, 2014

(87) PCT Pub. No.: WO2013/139437
PCT Pub. Date: Sep. 26, 2013

(65) Prior Publication Data
US 2015/0041579 A1 Feb. 12, 2015

(30) Foreign Application Priority Data
Mar. 19, 2012 (DE) .................. 10 2012 005 330

(51) Int. Cl.
*B60R 22/38* (2006.01)

(52) U.S. Cl.
CPC .......... *B60R 22/38* (2013.01); *B60R 2022/385* (2013.01)

(58) Field of Classification Search
CPC ...................................... B60R 22/38
USPC ...................................... 242/382.6
See application file for complete search history.

(56) References Cited

U.S. PATENT DOCUMENTS

| 4,350,313 A | * | 9/1982 | Adomeit ............... B60R 22/405 |
| | | | 242/376.1 |
| 4,673,144 A | | 6/1987 | Byford |
| 5,333,906 A | | 8/1994 | Fujimura et al. |
| 5,660,346 A | | 8/1997 | Dick |

FOREIGN PATENT DOCUMENTS

EP 0 112 032 6/1984

* cited by examiner

*Primary Examiner* — Sang Kim
(74) *Attorney, Agent, or Firm* — Tarolli, Sundheim, Covell & Tummino LLP

(57) ABSTRACT

A belt retractor (10) includes a frame (12) provided with locking teeth (36). A belt reel (14) is rotatably supported in the frame (12) and provided on at least one axial end with ratchet teeth (38) adapted to engage in the locking teeth (36), when the belt reel (14) is shifted from a home position into a locked position. A locking bearing (32) interacts with the belt reel (14) on the side where the ratchet teeth (38) are arranged and keeps the belt reel in the home position up to a first load threshold. A load bearing (34) interacts with the belt reel on the opposite side and keeps the latter in the home position up to a second load threshold. The first load threshold is lower than the second load threshold.

8 Claims, 3 Drawing Sheets

BELT RETRACTOR, AND METHOD FOR LOCKING A BELT RETRACTOR

RELATED APPLICATIONS

This application corresponds to PCT/EP2013/000651, filed Mar. 6, 2013, which claims the benefit of German Application No. 10 2012 005 330.4, filed Mar. 19, 2012, the subject matter, of which are incorporated herein by reference in their entirety.

BACKGROUND OF THE INVENTION

The invention relates to a belt retractor comprising a frame provided with locking teeth and comprising a belt reel which is rotatably supported in the frame and is provided on at least one axial end with ratchet teeth adapted to engage in the locking teeth, when the belt reel is shifted from a home position into a locked position. Further the invention relates to a method for locking a belt reel of such belt retractor.

In said belt retractor the belt reel is displaced relative to the frame for locking so that the ratchet teeth arranged on the belt reel are engaged in the locking teeth provided on the frame. In the previously employed belt retractors the belt reel is displaced in total such that the axis of the belt retractor is offset in the direction of the locking teeth so that the load is transferred via both flanges of the belt reel. Thus a very complicated support of the belt reel is required.

SUMMARY OF THE INVENTION

It is the object of the invention to provide a belt retractor which allows better reaction behavior mainly with low extension forces as well as an improved reset of the belt reel into the home position.

In accordance with the invention, in a belt retractor of the type mentioned in the beginning there is provided a locking bearing interacting with the belt reel on the side where the ratchet teeth are arranged and keeping the belt reel in the home position up to a first load threshold, and a load bearing interacting with the belt reel on the opposite side and keeping the latter in the home position up to a second load threshold, the first load threshold being lower than the second load threshold.

Hence for locking with low extension forces merely the locking bearing is displaced, i.e. the belt reel is tilted so-to-speak about the load bearing. The invention is based on the consideration that with low extension forces the entire load can be transferred via a flange. Therefore with these low extension forces for releasing the locking of the belt reel only one bearing, i.e. the locking bearing, has to be removed into the home position. This resetting force can be brought about, for example, by appropriately configuring the load bearing by which the belt reel is resiliently removed into the home position. Only with high extension forces the load bearing is equally displaced so that the belt reel is displaced in total in parallel to the home position and the axis of the belt reel is thus positioned at right angles with the extension direction again and load transfer is possible via both flanges of the belt reel.

The load threshold of the load bearing is preferably higher than 300 N so that with the plurality of the usual locking operations, for example during braking, only the locking bearing is displaced.

Preferably a control mechanism is provided which is adapted to displace the belt reel from a home position to a locked position in which the ratchet teeth are engaged with the locking teeth. Such control mechanism ensures that the belt reel and the ratchet teeth of the belt reel, resp., are aligned so that they can engage in the locking teeth of the frame. This control mechanism guarantees that the toothing of the belt reel is introduced in a correct position into the locking teeth of the frame so that engagement of the toothing in the locking teeth is brought about before high loads act on the belt reel.

The control mechanism includes, for example, a control lever pivoted on the frame side which acts on the blocking bearing and is adapted to displace the belt reel into the locked position.

Preferably the belt reel is supported on said control lever so that a separate support for the belt reel on this side is dispensed with.

The locking bearing can have a guiding pin supported in an inclined guiding passage the bottom of which encloses an angle within the range of from 50° to 80°, preferably of 60°, with the longitudinal axis of the belt reel. The guiding passage permits the belt reel to displace out of the home position into the locking position, when appropriate forces act on the belt reel. It is an advantage of this design that no separate components are required to move the belt reel into the locked position and, resp., back into the home position. Since the belt reel is biased in the direction of its axis by such displacement, a reset into the home position takes place automatically. A separate resetting mechanism is thus not required. This guiding passage preferably exhibits a length in the magnitude of 3 mm. It has turned out that already such short distance from the home position to the locking position is sufficient to keep the belt reel in the normal operation, when it is in the home position, reliably supported without the ratchet teeth inadvertently engaging in the locking teeth.

It is also imaginable, however, that separate resetting springs are provided on the locking bearing and/or on the load bearing for forcing the locking bearing and/or the load bearing into the home position. Such resetting spring is adapted to exactly adjust the desired resetting force. Moreover, by selecting an appropriate resetting spring also the desired load threshold of the respective bearing can be adjusted.

Preferably each of the locking bearing and/or the load bearing is arranged in a housing shell of the housing and is movable in the same to a limited extent. The housing shell on the one hand permits individual adaptation of the locking bearing and the load bearing, resp., so that the load thresholds of both bearings can be adapted in a rapid and uncomplicated manner. On the other hand, these housing shells safely protect both bearings from external influences so that reliable functioning of the belt retractor is ensured.

In accordance with the invention, furthermore a method of locking a belt retractor according to the invention is provided, wherein with low extension force merely the locking bearing is displaced so that the ratchet teeth engage in the locking teeth and the load bearing is displaced only upon a defined higher extension force. As regards the resulting advantages the foregoing explanations are referred to.

BRIEF DESCRIPTION OF THE DRAWINGS

Further advantages and features will be resulting from the following description in combination with the enclosed drawings, in which.

DESCRIPTION OF EXEMPLARY EMBODIMENTS

Figure 1:
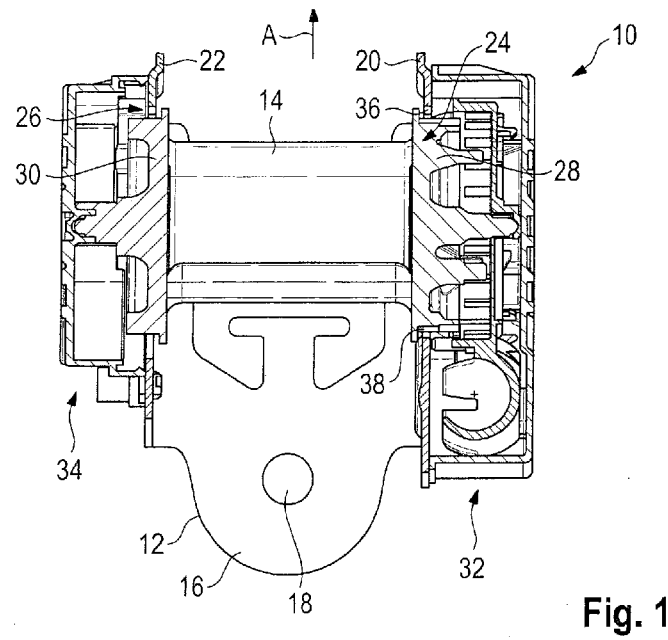
FIG. 1 shows a sectional view across the belt retractor according to the invention comprising the belt reel in a home position.
Figure 2:
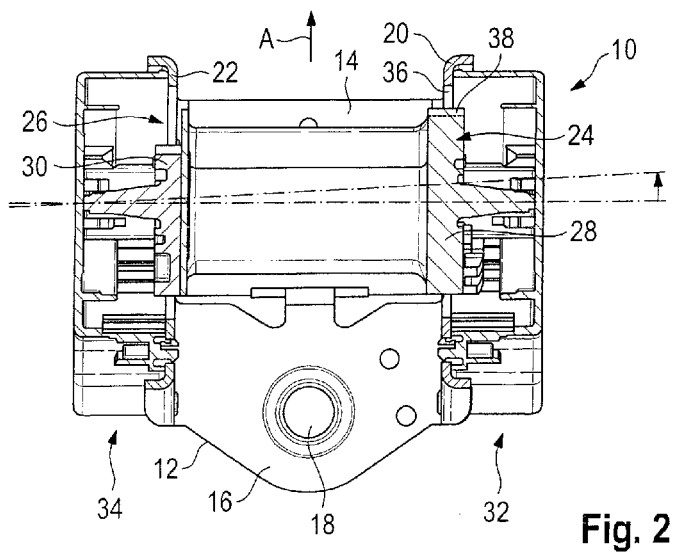
FIG. 2 shows the belt retractor of FIG. 1 with the locking bearing in a locked position, FIGS. 3 a) to c) show a schematic representation of the functioning of the belt retractor of FIG. 1.

In FIGS. 1 and 2 a belt retractor 10 is illustrated comprising a frame 12 in which a belt reel 14 is rotatably supported. The frame 12 includes a rear member 16 having an opening 18 for fastening the belt retractor 10 as well as two side members 20, 22. Each of them includes an opening 24, 26 within which flanges 28, 30 provided at a respective axial end of the belt reel 14 are accommodated.

The first side member 20 constitutes a locking, bearing 32 jointly with the first flange 28. In the opening 24 of the first side member 20 locking teeth 36 are provided which interact with ratchet teeth 38 provided on the first flange 28 of the belt reel 14 and in this way can prevent the belt reel 14 from rotating. Hence for locking the belt reel 14 the first flange 28 of the belt reel 14 must be displaced in the extension direction A so that the ratchet teeth 38 engage in the locking teeth 36. Jointly with the second flange 30 the second side member 22 constitutes a load bearing 34. On the latter equally a locking mechanism or a drive of the belt retractor 10 can be provided.

The belt reel 14 is supported to be movable to a limited extent both in the locking bearing 32 and in the load bearing 34 in an extension direction A of the belt webbing. Each of the locking bearing 32 and the load bearing 34 has a load threshold corresponding to a defined force acting in the extension direction A which has to act on the belt reel and the flanges 28, 30 of the belt reel 14, resp., so as to displace the respective flange 28, 30 in the extension direction A out of the home position.

The load threshold of the locking bearing 32 is lower than the load threshold of the load bearing 34 in this case so that the locking bearing 32 moves upon extension forces that are lower than a limit extension force and the flange 28 is displaced against the locking teeth (FIG. 2). Only when the extension force increases so that also the load threshold of the load bearing is exceeded, the latter is displaced in the extension direction A so that upon an extension force being above the limit extension force the belt reel is displaced so-to-speak in parallel to the home position and the axis of the belt reel extends normal to the extension direction A again.

The functioning of this belt retractor 10 is based on the consideration that with low extension forces a load transfer via a flange of the belt reel, i.e. by means of the locking bearing 32, is sufficient. Only in the case of higher extension forces the load is transferred via both flanges and thus via both bearings 32, 34 again which then are both adjacent to the frame 12 in the extension direction A. Moreover, the axis of the belt reel 14 in this position extends normal to the extension direction A again so that the webbing is straightly unwound from the belt reel 14.

On both bearings 32, 34 means are provided which are adapted to urge or move the respective bearing 32, 34 back into the home position. They may be formed by springs, for example, or by a mechanism actively moving the flanges 28, 30 into the home position.

Moreover, at the locking bearing 32 a control mechanism is provided for aligning the belt reel in the correct position before it is displaced into the locked position so that the ratchet teeth can engage in the locking teeth.

Figure 3A:
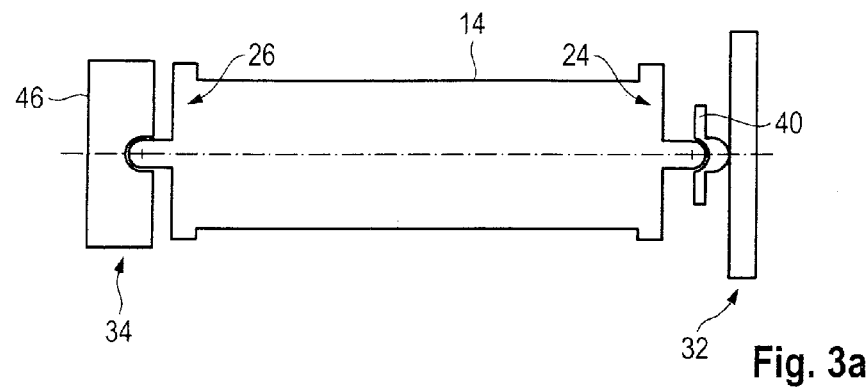

The functioning of the belt retractor 10 is shown once again schematically in FIGS. 3a) to c).

During regular operation the belt reel 14 is provided in an initial position in which both bearings 32, 34 are provided in the home position (FIG. 3a). In this case the locking bearing 32 is supported in a control lever 40 which is adapted to displace the belt reel 14 and ensures that the ratchet teeth 38 are adapted to engage in the locking teeth 36.

Figure 3B:
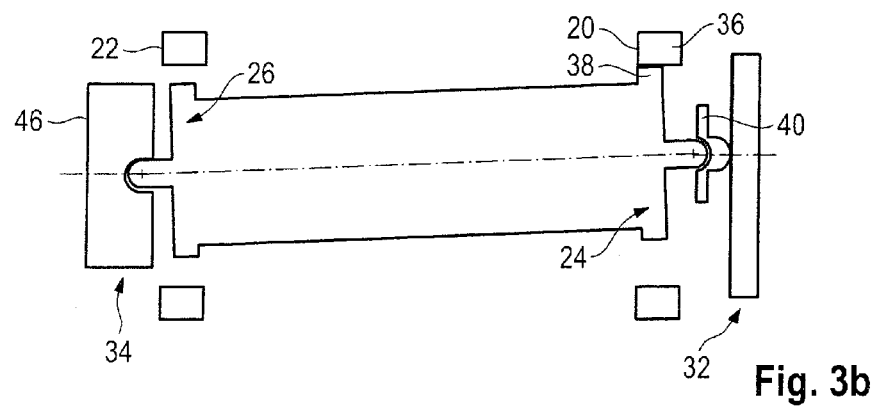

When a first load threshold is exceeded, the locking bearing 32 is moved in the extension direction A so that the ratchet teeth 38 engage in the locking teeth and the belt reel 14 is locked (FIG. 3b).

Figure 3C:
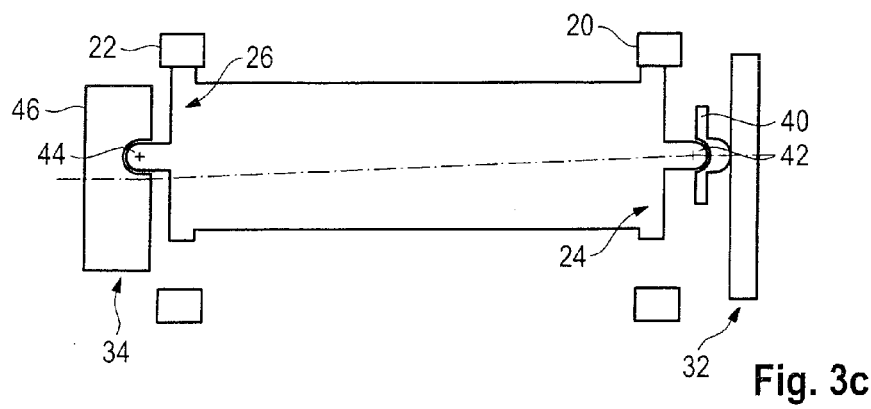

After the load threshold of the load bearing 34 is exceeded, the flange 30 is equally displaced so that also the latter is adjacent to the frame 12 and to the side member 22 of the belt retractor 10, respectively (FIG. 3c). The load transfer from the belt reel 14 to the frame 12 can now take place evenly via both side members 20, 22 of the frame 12.

In the embodiment shown in FIGS. 3a) to c) each of the locking bearing 32 and the load bearing 34 includes a guiding pin 42, 44 provided at the respective flange 28, 30 of the belt reel 14. The guiding pin 42 of the locking bearing 32 is supported in the control lever 40 of the control mechanism.

The guiding pin 44 of the load bearing 34 is fixedly supported in a bearing element 46. When the extension force increases beyond the load threshold of the load bearing 34, the entire bearing element 46 is displaced in the extension direction A.

The locking bearing 32 in the embodiment shown in FIGS. 3 a) to c) cannot only be supported to be movable in the extension direction A, but can optionally also permit an additional movement in the axial direction of the belt reel 14.

Figure 4:
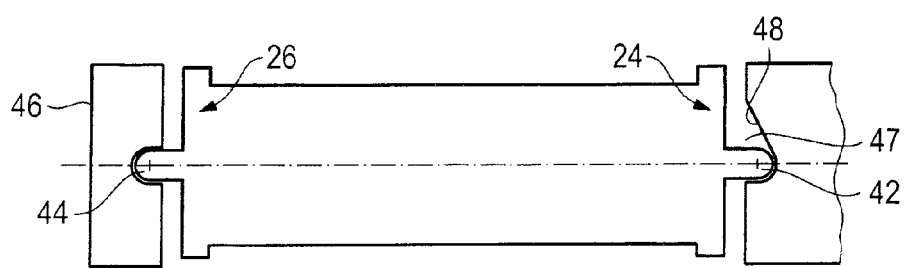
FIG. 4 shows a schematic representation of an alternative embodiment of a belt retractor according to the invention.

Another embodiment is schematically illustrated in FIG. 4. The guiding pin 42 of the locking bearing 32 is arranged in this case in a frame-side guiding passage 47 which is inclined in the extension direction A. When an extension force acts on the belt reel 14, the guiding pin 42 is displaced along the guiding passage 47, the first flange 28 being displaced so that the ratchet teeth 38 engage in the locking teeth 36.

In this embodiment the load threshold of the locking bearing 32 can be adjusted via the inclination of the bottom 48 of the guiding passage 47. Preferably, the angle of inclination is within the range of from 50° to 80°, preferably 60° relative to the longitudinal axis of the belt reel in the home position. The depth of the guiding passage preferably is approx. 3 mm. Since the belt reel 14 is biased when the locking bearing 32 is displaced into the locked position, a resetting force which forces the first flange 28 back into the home position acts on the locking bearing 32.

Alternatively, the load thresholds of both bearings 32, 34 can also be adjusted via spring elements.

The limit load threshold of the load bearing 34 preferably is selected so that the load bearing is displaced only upon a tensile force of more than 300 N acting in the extension direction A.

Preferably each of the two bearings 32, 34 is supported in a housing shell and is movable in the same to a restricted extent so that the bearings 32, 34 are protected from external influences.

The invention claimed is:

1. A belt retractor (10) comprising a frame (12) provided with locking teeth (36), a belt reel (14) which is rotatably supported in the frame (12) and is provided at least on one axial end with ratchet teeth (38) adapted to engage in the locking teeth (36) when the belt reel (14) is shifted from a home position into a locked position, a locking bearing (32) interacting with the belt reel (14) on the side where the ratchet teeth (38) are arranged and keeping said belt reel in the home position up to a first load threshold, and a load bearing (34) interacting with the belt reel (14) on the opposite side and keeping the latter in the home position up to a second load threshold, the first load threshold being lower than the second load threshold, wherein a control mechanism is provided which is adapted to displace the belt reel (14) from the home position into the locked position in which the locking teeth (36) are engaged with the ratchet teeth (38) and wherein that control mechanism includes a control lever (40) pivoted on the frame side which acts on the locking bearing (32) and is adapted to displace the belt reel (14) into the locked position.

2. The belt retractor according to claim 1, wherein the second load threshold is higher than 300 N.

3. The belt retractor according to claim 1, wherein the belt reel (14) is supported on the control lever (40).

4. A method of locking a belt reel (14) in a belt retractor (10) according to claim 1, wherein belt webbing wound on the belt reel (14) is configured to apply a low extension force to the belt reel (14) between the first load threshold and the second load threshold to displace the locking bearing (32) so that the locking teeth (36) engage in the ratchet teeth (38), and the belt webbing being configured to apply a higher extension force above the second load threshold to displace the load bearing (34).

5. A belt retractor (10) comprising a frame (12) provided with locking teeth (36), a belt reel (14) which is rotatably supported in the frame (12) and is provided at least on one axial end with ratchet teeth (38) adapted to engage in the locking teeth (36) when the belt reel (14) is shifted from a home position into a locked position, a locking bearing (32) interacting with the belt reel (14) on the side where the ratchet teeth (38) are arranged and keeping said belt reel in the home position up to a first load threshold, and a load bearing (34) interacting with the belt reel (14) on the opposite side and keeping the latter in the home position up to a second load threshold, the first load threshold being lower than the second load threshold, wherein a control mechanism is provided which is adapted to displace the belt reel (14) from the home position into the locked position in which the locking teeth (36) are engaged with the ratchet teeth (38), and wherein the locking bearing (32) includes a guiding pin (42) supported in an inclined guiding passage (47) the bottom of which draws an angle ranging from 50° to 80° with the longitudinal axis of the belt reel (14).

6. The belt retractor according to claim 5, wherein the guiding passage (47) has a length within the magnitude of 3 mm.

7. The belt retractor according to claim 5, wherein the bottom of the inclined guiding passage (47) draws an angle of 60° with the longitudinal axis of the belt reel (14).

8. A belt retractor comprising:
a frame having locking teeth;
a belt reel rotatably supported in the frame and including first and second axial ends, the first axial end including ratchet teeth spaced from the locking teeth when the belt reel is in a home position and engaged with the locking teeth when the belt reel is in a locked position;
a locking bearing interacting with the first axial end of the belt reel for maintaining the first axial end in the home position up to a first load threshold applied to the belt reel;
a load bearing interacting with the second axial end of the belt reel for maintaining the second axial end in the home position up to a second load threshold applied to the belt reel greater than the first load threshold, and
a control mechanism adapted to displace the belt reel from the home position into the locked position to engage the locking teeth with the ratchet teeth, the control mechanism including a control lever pivoted on the frame side which acts on the locking bearing to allow for displacement of the belt reel into the locked position.

\* \* \* \* \*